UNITED STATES PATENT OFFICE.

AUGUST LEOPOLD LASKA, OF OFFENBACH-ON-THE-MAIN, GERMANY, ASSIGNOR TO CHEMISCHE FABRIK GRIESHEIM-ELEKTRON, OF FRANKFORT-ON-THE MAIN, GERMANY, A CORPORATION.

BLUE COTTON DYE AND PROCESS OF MAKING SAME.

No. 860,220.      Specification of Letters Patent.      Patented July 16, 1907.

Application filed March 22, 1907. Serial No. 363,938.

*To all whom it may concern:*

Be it known that I, AUGUST LEOPOLD LASKA, doctor of philosophy, chemist, and a resident of 5 Gerberstrasse, Offenbach-on-the-Main, in the Grand Duchy of Hesse, Germany, have invented new and useful Improvements in Blue Cotton Dyes and Process of Making Same, of which the following is a specification.

My invention relates to the manufacture of new cotton dyes produced by combining tetrazotized diamidobases with one molecular proportion of a peri-dioxynaphthalene sulfoacid and one molecular proportion of 2 arylamido 5 naphthol 7 sulfoacid. The thus obtained dyestuffs dye cotton violet to blue shades of excellent brightness surpassing in this point similar commercial azodyes. The 2 arylamido 5 naphthol 7 sulfoacid, employed in the manufacture of these dyestuffs, makes them fast to sodium carbonate so that they can be dyed in an alkaline or neutral bath.

Among the diamidobases benzidin, tolidin or dianisidin may be used.

The following example will serve to illustrate my invention; parts being by weight: A solution of the tetrazo-compound, obtained from 12.2 parts of dianisidin in the well known manner, is poured into an ice cold solution of 18.2 parts of 1:8 dioxy naphthalene 3:6 disulfoacid (sodium salt) containing a sufficient quantity of sodium acetate to remove the excess of hydrochloric acid. When the intermediate product is formed the solution is rendered alkaline by sodium carbonate and a neutral solution of 16 parts of 2 phenylamido 5 naphthol 7 sulfoacid is added. To complete the formation of the dyestuff the mixture is stirred for twelve hours, heated up to 70° C. and the coloring matter precipitated by addition of common salt. The dyestuff, in a dry state being a black powder, dissolves in concentrated sulfuric acid to a greenish blue, in water to a reddish blue solution. The color of this solution is hardly altered by addition of caustic soda lye or hydrochloric acid. The dyestuff produces on cotton very bright blue shades.

In the production of this coloring matter the 1:8 dioxy-naphthalene 3:6 disulfoacid can be replaced by any other peridioxy-naphthalene sulfoacid, for instance by the 1:8 dioxy-naphthalene 3:5 disulfoacid; the 2 phenylamido 5 naphthol 7 sulfoacid can be replaced by any other arylcompound f. i. by the tolylamidonaphthol sulfoacid. All the thus obtained dyestuffs dye cotton very bright blue tints. In employing other diamidobases f. i. benzidin or tolidin dyestuffs are obtained, which dye more reddisher shades on cotton.

Now what I claim and desire to secure by Letters Patent is the following:

1. The process of manufacturing new cotton dyestuffs, which consists in combining the tetrazocompounds of the said diamidobases with one molecular proportion of a peridioxynaphthalene sulfoacid and one molecular proportion of a 2 arylamido 5 naphthol 7 sulfoacid.

2. The process of manufacturing new cotton dyestuffs which consists in combining the tetrazocompound of dianisidin with one molecular proportion of a peridioxynaphthalene sulfoacid and one molecular proportion of 2 arylamido 5 naphthol 7 sulfoacid.

3. As a new article of manufacture the dyestuffs obtained by combining the tetrazocompounds of dianisidin with one molecular proportion of a peridioxynaphthalene sulfoacid and one molecular proportion of 2 arylamido 5 naphthol 7 sulfoacid, being brown black powders, dissolving in concentrated sulfuric acid to a greenish blue, in water to a reddish blue solution, and dyeing cotton very bright blue tints.

4. As a new article of manufacture the dyestuffs obtained by combining the tetrazocompound of dianisidin with one molecular proportion of 1:8 dioxynaphthalene 3:6 disulfoacid and one molecular proportion of 2 arylamido 5 naphthol 7 sulfoacid, being brown black powders, dissolving in concentrated sulfuric acid to a greenish blue, in water to a reddish blue solution, and dyeing cotton very bright blue tints.

In testimony, that I claim the foregoing as my invention, I have signed my name in presence of two witnesses, this seventh day of March 1907.

AUGUST LEOPOLD LASKA.

Witnesses:
EVA SATTLER,
HERMANN WEIL.